(12) United States Patent
Tao

(10) Patent No.: US 7,018,775 B2
(45) Date of Patent: Mar. 28, 2006

(54) INFRARED ABSORBING N-ALKYLSULFATE CYANINE COMPOUNDS

(75) Inventor: Ting Tao, Fort Collins, CO (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/736,364

(22) Filed: Dec. 15, 2003

(65) Prior Publication Data

US 2005/0130059 A1 Jun. 16, 2005

(51) Int. Cl.
*G03C 1/73* (2006.01)

(52) U.S. Cl. .................. 430/270.1; 430/944; 430/964; 430/905

(58) Field of Classification Search ................ 548/156, 548/178, 179, 159, 181, 219, 237, 239, 305.4, 548/302.7, 304.4, 306.1, 347.1, 350.1, 351.1, 548/455, 469, 490, 503, 509, 510, 565, 574; 430/270.1, 944, 964, 905
See application file for complete search history.

(56) References Cited

U.S. PATENT DOCUMENTS

| | | | |
|---|---|---|---|
| 5,107,063 A | | 4/1992 | West et al. |
| 5,260,178 A | | 11/1993 | Harada et al. |
| 5,330,884 A | | 7/1994 | Fabricius et al. |
| 5,440,042 A | | 8/1995 | Fabricius et al. |
| 5,972,838 A | | 10/1999 | Pearce et al. |
| 6,159,657 A | * | 12/2000 | Fleming et al. .......... 430/270.1 |
| 6,187,502 B1 | | 2/2001 | Chapman et al. |
| 6,534,041 B1 | | 3/2003 | Licha et al. |
| 6,537,739 B1 | * | 3/2003 | Twist .................. 430/403 |
| 2004/0081622 A1 | * | 4/2004 | Achilefu et al. ............. 424/9.6 |

FOREIGN PATENT DOCUMENTS

| | | |
|---|---|---|
| EP | 0 288 076 | 10/1988 |
| EP | 1 057 622 A2 | 12/2000 |
| FR | 1.149.769 | 12/1957 |
| JP | 63-033477 | 2/1988 |
| JP | 10-239834 | 11/1998 |
| WO | WO 02/24815 A1 | 3/2002 |

OTHER PUBLICATIONS

JP Abstract 10-239834, Nov. 9, 1998, Shinji.

* cited by examiner

*Primary Examiner*—Sin Lee
(74) *Attorney, Agent, or Firm*—J. Lanny Tucker

(57) ABSTRACT

Infrared absorbing N-alkylsulfate cyanine compounds and imageable compositions containing the compounds are disclosed. The compounds have the structure I:

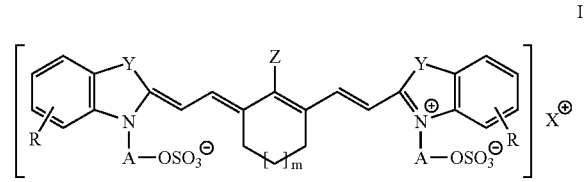

in which:
R is hydrogen, or R is one or more alkyl, substituted or unsubstituted aralkyl, alkoxy, carboxyl, nitro, cyano, trifluoromethyl, acyl, alkyl sulfonyl, aryl sulfonyl, or halogen groups, or R is the atoms necessary to form a substituted or unsubstituted benzo group;
A is $(CH_2)_n$; where n is 1–5; preferably 2–4;
Y is O, S, NR', or $C(R')_2$, where R' is hydrogen or alkyl; preferably methyl;
Z is hydrogen, halogen, alkyl, substituted or unsubstituted aralkyl; substituted or unsubstituted aroxyl, substituted or unsubstituted thioaroxyl, or substituted or unsubstituted diphenylamino;
m is zero or one; and
X is a cation, preferably sodium, potassium, lithium, ammonium, or substituted ammonium.

17 Claims, No Drawings

INFRARED ABSORBING N-ALKYLSULFATE CYANINE COMPOUNDS

FIELD OF THE INVENTION

The invention relates to infrared absorbing compounds. In particular, this invention relates infrared absorbing N-alkylsulfate cyanine compounds and to their use in lithographic printing plate precursors.

BACKGROUND OF THE INVENTION

In conventional or "wet" lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically comprise an imageable layer applied over the hydrophilic surface of a substrate. The imageable layer includes one or more radiation-sensitive components, which may be dispersed in a suitable binder. Alternatively, the radiation-sensitive component can also be the binder material. Following imaging, either the imaged regions or the unimaged regions of the imageable layer are removed by a suitable developer, revealing the underlying hydrophilic surface of the substrate. If the imaged regions are removed, the precursor is positive working. Conversely, if the unimaged regions are removed, the precursor is negative working. In each instance, the regions of the imageable layer (i.e., the image areas) that remain are ink-receptive, and the regions of the hydrophilic surface revealed by the developing process accept water and aqueous solutions, typically a fountain solution, and repel ink.

Conventionally, imaging of the imageable element with ultraviolet and/or visible radiation has been carried out through a mask, which has clear and opaque regions. Direct digital imaging, which obviates the need for imaging through a mask, is becoming increasingly important in the printing industry. Imageable elements for the preparation of lithographic printing plates have been developed for use with infrared lasers. Thermally imageable elements that are to be imaged with infrared radiation, such as with a laser or an array of lasers emitting modulated near infrared or infrared radiation in the range of about 800 nm to about 1200 nm typically about 830 nm, about 1056 nm, or about 1064 nm, typically comprise an infrared absorber known as a photothermal conversion material. Photothermal conversion materials absorb radiation and convert it to heat.

Following imaging, the resulting imaged imageable elements typically require processing in a developer to convert them to lithographic printing plates. Developers are typically aqueous alkaline solutions, which may also contain substantial amounts of organic solvents. Because of their high pH and the presence of organic solvents, disposal of substantial quantities of developer is expensive and can cause environmental problems. Processing of the image imageable element in a developer also introduces additional costs in, for example, the cost of the developer, the cost of the processing equipment, and the cost of operating the process.

On-press developable lithographic printing plate precursors can be directly mounted on a press after imaging and developed with ink and/or fountain solution during the initial press operation. These precursors do not require a separate development step before mounting on press. On press imaging, in which the precursor is both imaged and developed on press, eliminates mounting the precursor in a separate imaging device.

On-press developable thermally imageable elements require compounds that absorb infrared radiation and are soluble in or removable by fountain solution. Thus, a need exists for infrared absorbers that are soluble in or removable by ink and/or fountain solution for use in on press developable imageable elements.

SUMMARY OF THE INVENTION

The invention is an infrared absorbing cyanine compound that contains N-alkyl sulfate groups. The compound has a general formula (I) as follow:

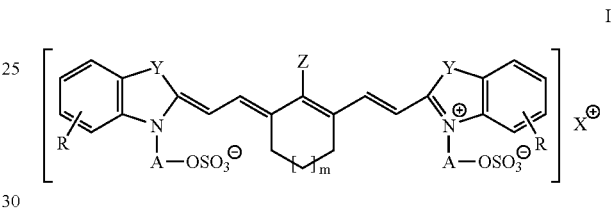

in which:

R is hydrogen, or R is one or more alkyl, substituted or unsubstituted aralkyl, alkoxy, carboxyl, nitro, cyano, trifluoromethyl, acyl, alkyl sulfonyl, aryl sulfonyl, or halogen groups, or R is the atoms necessary to form a substituted or unsubstituted benzo group;

A is $(CH_2)_n$; where n is 1–5; preferably 2–4;

Y is O, S, NR', or $C(R')_2$, where R' is hydrogen or alkyl; preferably methyl;

Z is hydrogen, halogen, alkyl, substituted or unsubstituted aralkyl; substituted or unsubstituted aroxyl, substituted or unsubstituted thioaroxyl, or substituted or unsubstituted diphenylamino;

m is zero or one; and

X is a cation, preferably sodium, potassium, lithium, ammonium, or substituted ammonium.

These infrared absorbing cyanine compounds are soluble in or removable by ink and/or fountain solution. They can be used in on press developable imageable elements.

DETAILED DESCRIPTION OF THE INVENTION

The infrared absorbing N-alkyl sulfate cyanine compounds of the invention are defined by Structure I, above.

R may be hydrogen or an alkyl group, typically a straight chain or branched alkyl group containing one to twelve carbon atoms. Alkyl refers a straight chain or branched hydrocarbon group. Typical alkyl groups include, for example 2-methylbutyl, 3-methylbutyl, pentyl, hexyl, heptyl, octyl, nonyl, decyl, undecyl, dodecyl, 2,2-dimethylpropyl, 4-methylpentyl, 3-methylpentyl, 2-methylpentyl, 2-methylhexyl, 3-ethylpentyl, 5-methylhexyl, 2,2,4-trimethylpentyl, cyclopentyl, cyclohexyl, and alkyl groups of one to four carbon atoms. R is preferably an alkyl group of one to four carbon atoms, such as methyl, ethyl, cyclopropyl, i-propyl, n-propyl, cyclobutyl, i-butyl, s-butyl, t-butyl, or n-butyl.

R may be an alkoxy group. Alkoxyl refers to an oxygen substituted with a straight chain or branched alkyl group, typically containing one to twelve carbon atoms, preferably one to four carbon atoms. Alkoxy groups include, for example, methoxy, ethoxy, n-propoxy, i-propoxy, n-butoxy, i-butoxy, s-butoxy, t-butoxy, n-pentoxy, 2,2,dimethylpropoxy, n-hexyloxy, n-heptyloxy, n-octyloxy, n-nonyloxy, and n-decyoxy. Preferred alkoxy groups, when present, are methoxy and ethoxy.

R may be an aralkyl group, preferably one containing seven to twelve carbon atoms. An aralkyl is an alkyl group substituted with a substituted or unsubstituted aryl group. Aryl refers to an aromatic group such as phenyl group or naphthyl. Substituted aryl refers to an aryl group substituted with at least one group selected from alkyl, alkoxyl, halogen, cyano, aralkyl, aroxyl, and thioaroxyl groups. Typical aryl groups are phenyl; substituted phenyl, such as p-methylphenyl (p-tosyl), m-methylphenyl (m-tosyl), o-methylphenyl (o-tosyl), p-methoxyphenyl, p-chlorophenyl, p-bromophenyl, p-cyanophenyl, p-fluorophenyl, pentafluorophenyl, p-trifluoromethylphenyl, 3,5-dimethylphenyl, and 3,5-dichlorophenyl; 1-naphthyl; 2-naphthyl; and substituted 1-naphthyl and 2-naphthyl. Typically aralkyl groups include, for example, benzyl, (4-methylphenyl)methyl-, (4-chlorophenyl)methyl-, (3-methylphenyl)methyl-, (4-cyanophenyl)methyl-, (4-methoxyphenyl)methyl-, 2-phenylethyl, 2-(4-cyanophenyl)methyl)ethyl- and 3-phenyl propyl.

R may be a halogen. Halogens include fluorine (F), chlorine (Cl), bromine (Br), and iodine (I).

R may be an acyl group, preferably an acyl group of seven or fewer carbon atoms such as formyl, acetyl, propionyl, or benzoyl.

R may be an alkyl sulfonyl or an aryl sulfonyl group, preferably of seven or fewer carbon atoms such as phenyl sulfonyl, 4-methylphenyl sulfonyl, methyl sulfonyl, and ethyl sulfonyl. R may be nitro, carboxyl, trifluoromethyl, or cyano.

R may be the atoms necessary to form a substituted or unsubstituted benzo group. When R is the atoms necessary to form, for example, a 4,5-benzo group, the cation may have, for example, the structure:

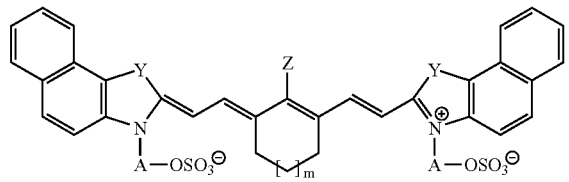

The benzo group may be a 2,3-benzo group, or a 3,4-benzo group. When the benzo group is a substituted benzo group, it may be substituted with one of more alkyl groups, alkoxyl groups, substituted or unsubstituted aralkyl groups, or halogens, such as described above.

A is $(CH_2)_n$. n is 1–5; preferably 2–4. m is zero or one.

Y is O, S, NR', or $C(R')_2$, where R' is hydrogen or alkyl. Alkyl groups are described above. Y is preferably S or $C(R')_2$. R' is preferably methyl.

Z may be hydrogen, halogen, alkyl, substituted or unsubstituted aralkyl; substituted or unsubstituted aroxyl, substituted or unsubstituted thioaroxyl, or substituted or unsubstituted diphenylamino. Alkyl, aryl, alkoxyl, substituted or unsubstituted aralkyl, and halogen groups are described above.

Z may be an aroxyl, preferably one containing six to twelve carbon atoms. Substituted or unsubstituted aroxyl refers to an oxygen substituted with a substituted or unsubstituted aryl group, such as are described above. Aroxyl groups include, for example, phenoxy, p-methylphenoxy, m-methylphenoxy, o-methylphenoxy, p-methoxyphenoxy, o-methoxyphenoxy, p-chlorophenoxy, 3,4-dichlophenoxy, p-flurophenoxy, pentafluorophenoxy, p-trifluoromethylphenoxy, p-cyanophenoxy, 1-naphthoxy, and 2-naphthoxy.

Z may be a substituted or unsubstituted thioaroxyl group, preferably one containing six to twelve carbon atoms. Substituted or unsubstituted thioaroxyl refers to a sulfur substituted with a substituted or unsubstituted aryl group, such as are given above. Thioaroxyl groups include, for example, thiophenoxy, p-methylthiophenoxy, m-methylthophenoxy, p-methoxythiophenoxy, p-chlorothiophenoxy, 3,4-dichlothiophenoxy, pentafluorothiophenoxy, and p-cyanothiophenoxy.

Z may be a substituted or unsubstituted diphenylamino group, such as diphenyl amino, di(4-methylphenyl)amino, di(4-methoxyphenyl)amino, phenyl(2-methylphenyl)amino, or di(4-chloro)phenylamino.

X is a cation, preferably a cation that forms a water soluble compound, such as sodium, potassium, lithium, ammonium, or substituted ammonium. X may be a substituted ammonium ion, preferably one containing one to sixteen carbon atoms, such as, for example, methyl ammonium, dimethyl ammonium, trimethyl ammonium, tetramethyl ammonium, ethyl ammonium, diethyl ammonium, trimethyl ammonium, tetraethyl ammonium, methyldiethyl ammonium, dimethylethyl ammonium, 2-hydroxyethyl ammonium, di-(2-hydroxyethyl)ammonium, tri-(2-hydroxyethyl)ammonium, 2-hydroxyethyl-dimethyl ammonium, n-propyl ammonium, di-(n-propyl)ammonium, tri-(n-propyl) ammonium, tetra-(n-butyl)ammonium, tetra-(isobutyl)ammonium, tetra-(sec-butyl)ammonium, and tetra (tert-butyl)ammonium.

The infrared absorbing N-alkyl sulfate cyanine compounds can be synthesized by following procedures. In the first step, a heterocyclic amine of structure II is reacted with a cyclic sulfate of structure III in organic solvent, such as xylene, at above 100° C. to form an inner salt of structure IV.

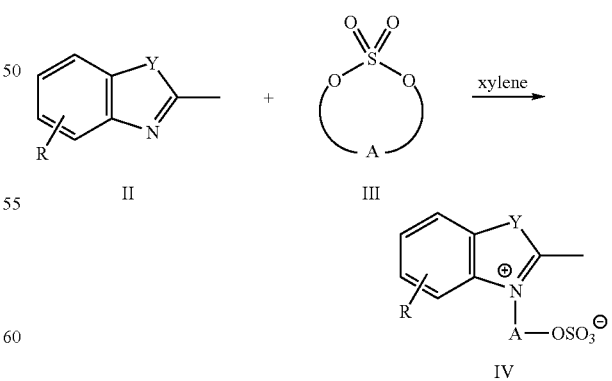

in which A is $—(CH_2)_n$, in which n=1–5, and R and Y are as defined above.

Heterocyclic amines of structure II that may be used include, for example, 2,3,3-trimethylindolenine (Fisher's base) (R is H and Y is C(CH$_3$)$_2$); 5-methoxy-2,3,3-trimethylindolenine (R is 5-methoxy and Y is C(CH$_3$)$_2$); 4-chloro-2,3,3-trimethylindolenine (R is 4-chloro and Y is C(CH$_3$)$_2$); 5-chloro-2,3,3-trimethylindolenine (R is 5-chloro and Y is C(CH$_3$)$_2$); 2,3,3,5,6-pentamethylindolenine (R is 5-methyl and 6-methyl, and Y is C(CH$_3$)$_2$); 1,2,-dimethylbenzimidazole (R is H, Y is NR', and R' is methyl); 1,2,5,-dimethylbenzimidazole (R is 5-methyl, Y is NR', and R' is methyl); 2-methylbenzoxazole (R is H and Y is O); 5-fluoro-2-methylbenzoxazole(R is 5-fluoro and Y is O); 5-chloro-2-methylbenzoxazole (R is 5-chloro and Y is O); 2,5-dimethylbenzoxazole (R is 5-methyl and Y is O); 2,5,6-trimethylbenzoxazole (R is 5-methyl and 6-methyl, and Y is O); 2-methylbenzothiazole (R is H and Y is S); 2,5-dimethylbenzothiazole (R is 5-methyl and Y is S); 5-methoxy-2-methylbenzothiazole (R is 5-methoxy and Y is S); 6-methoxy-2-methylbenzothiazole (R is 6-methoxy and Y is S); 5-fluoro-2-methylbenzothiazole (R is 5-fluoro and Y is S); 5-chloro-2-methylbenzothiazole (R is 5-chloro and Y is S); 6-chloro-2-methylbenzothiazole(R is 6-chloro and Y is S); 5,6-dichloro-2-methylbenzothiazole(R is 5-chloro and 6-chloro, and Y is S); 6-cyano-2-methylbenzothiazole(R is 6-cyano and Y is S); 2,3,3-trimethyl-4,5-benzo-3H-indole (R is the atoms necessary to form an unsubstituted benzo group and Y is C(CH$_3$)$_2$); 2,3,3-trimethyl-5,6-benzo-3H-indole (R is the atoms necessary to form an unsubstituted benzo group and Y is C(CH$_3$)$_2$); and 2,3,3-trimethyl-6,7-benzo-3H-indole (R is the atoms necessary to form an unsubstituted benzo group and Y is C(CH$_3$)$_2$). Cyclic sulfates include, for example, methylene sulfate (n is 1); 1,2-ethane diol cyclic sulfate (n is 2); 1,3-propanediol cyclic sulfate (n is 3); 1,4-butanediol cyclic sulfate, 1-methyl-1,3-propanediol cyclic sulfate, 2-methyl-1,3-propanediol cyclic sulfate, and 1,1-dimethyl-1,2-ethanediol cyclic sulfate (n is 4); and 1,5-pentanediol cyclic sulfate and 2,2-dimethyl-1,3-propanediol cyclic sulfate (n is 5).

In the second step, the inner salt of structure IV is condensed with a bisaldehyde of structure V in an organic solvent, such as dimethylformamide, at room or an elevated temperature, to produce the N-alkyl sulfate cyanine compound.

An amine (R"$_3$N in which each R" is typically independently hydrogen or an alkyl group), such as triethyl amine, is present in the reaction mixture. It forms a cation that compensates for the negative charge of one of the sulfate groups. Ammonia and/or other amines such as methyl amine, dimethyl amine, trimethyl amine, ethyl amine, diethylamine, n-propyl amine, n-butyl amine, n-hexyl amine, n-octyl amine, ethanol amine, diethanol amine, and triethanol amine may be used in place of or in addition to triethyl amine.

The cation may be converted to another cation, such as sodium or potassium, by dissolving the infrared absorbing cyanine compound in a mixture of water and an organic solvent, such as for example, methanol or ethanol, adding a salt that contains the desired cation, for example sodium acetate, stirring the reaction mixture, and filtering of the product.

Representative infrared absorbing N-alkyl sulfate cyanine compounds of the invention include, for example:

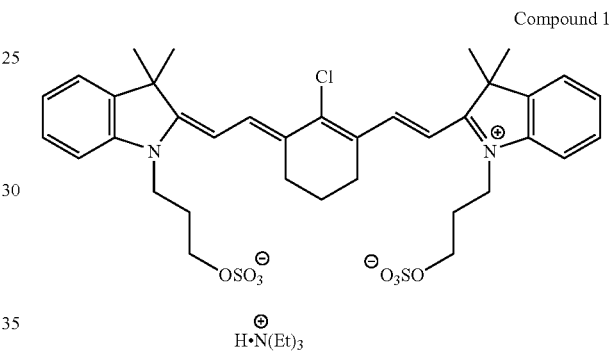

Compound 1

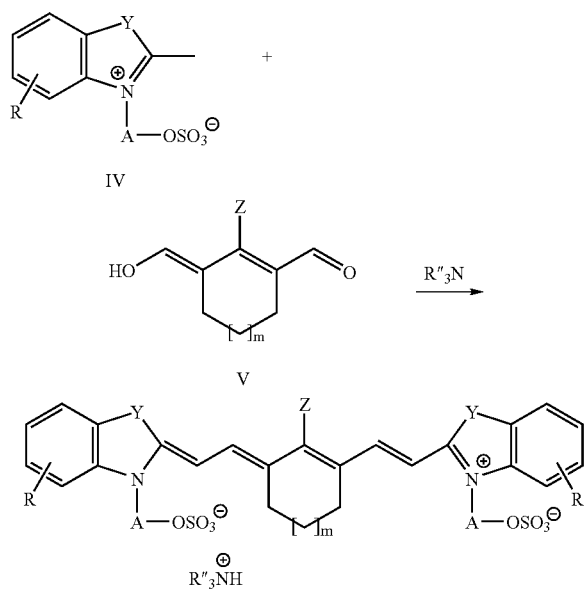

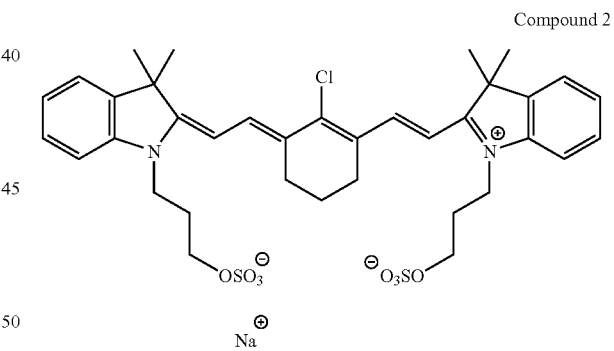

Compound 2

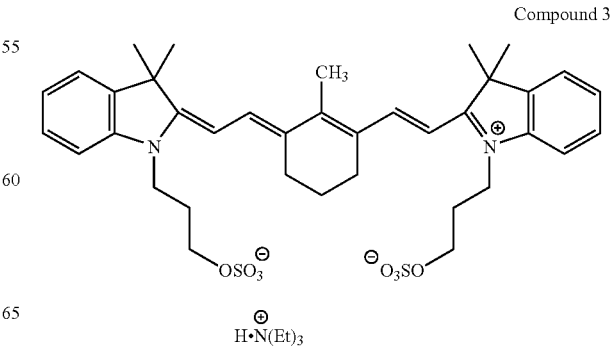

Compound 3

-continued
Compound 4
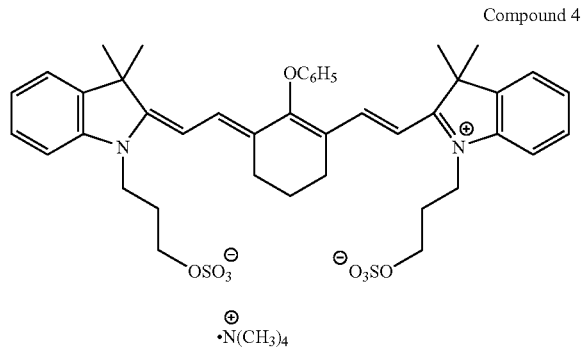
Compound 5
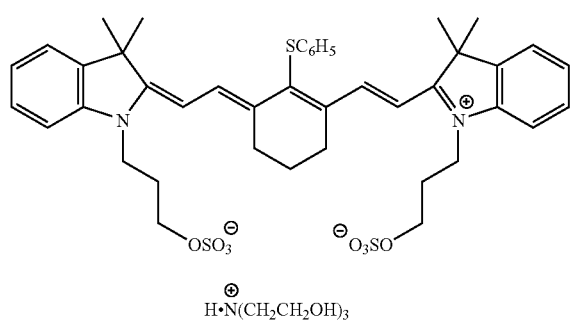
Compound 6
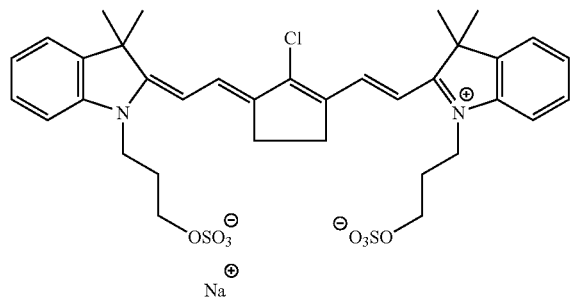
Compound 7
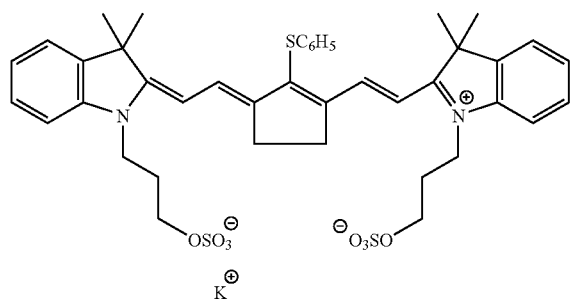
Compound 8
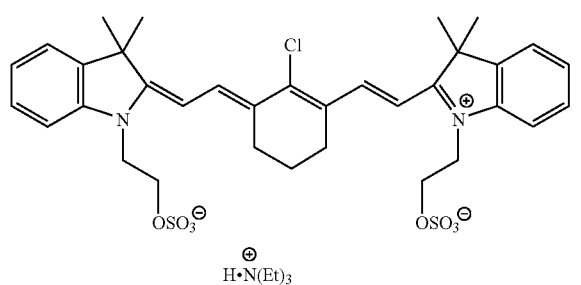
-continued
Compound 9
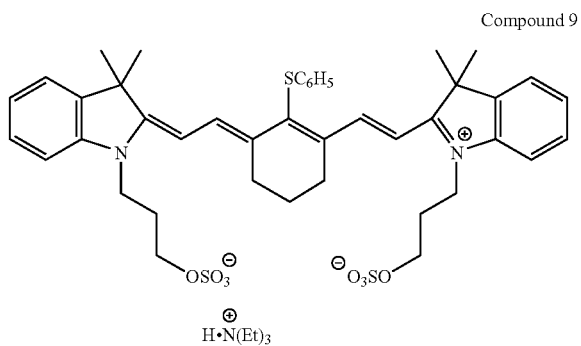
Compound 10
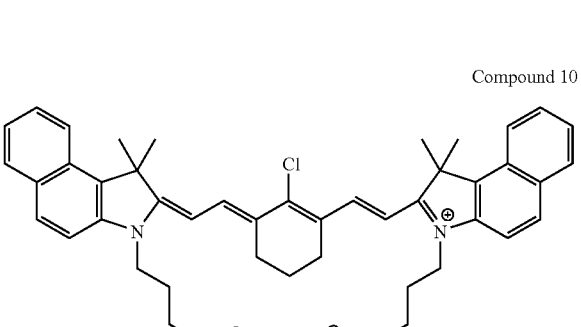
Compound 11
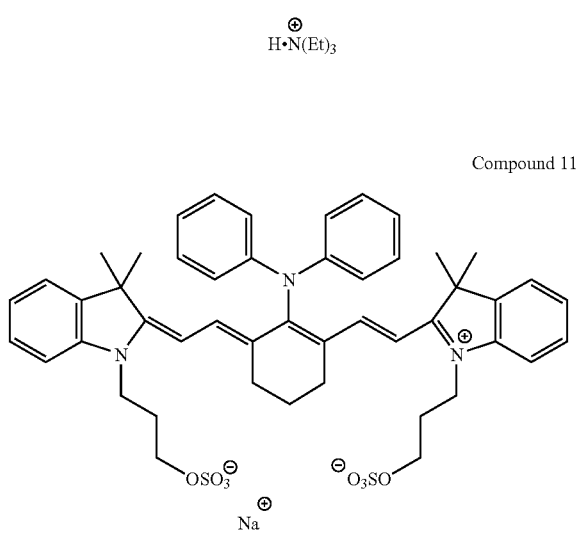
Compound 12
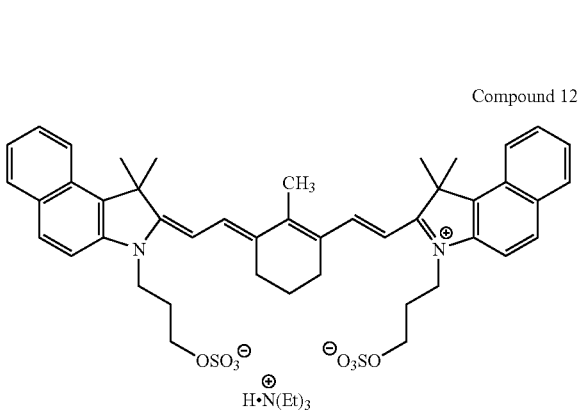

-continued

Compound 13
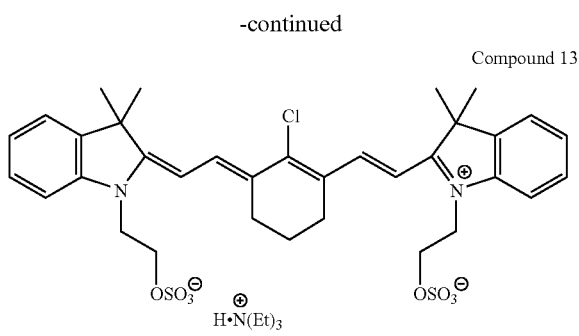

Compound 14
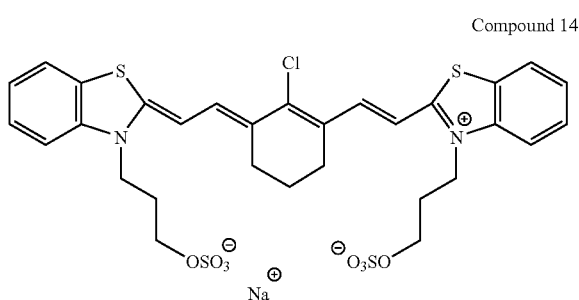

Compound 15
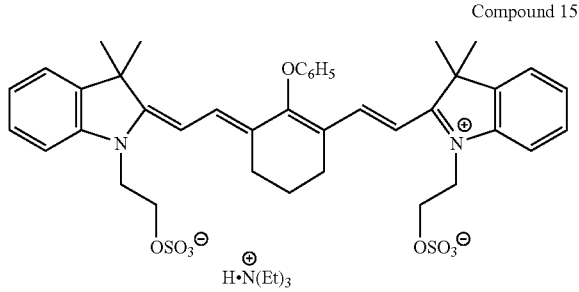

Compound 16
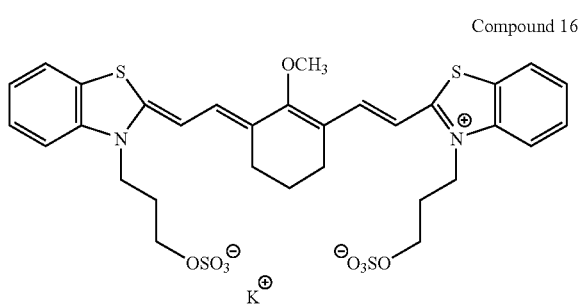

Compound 17
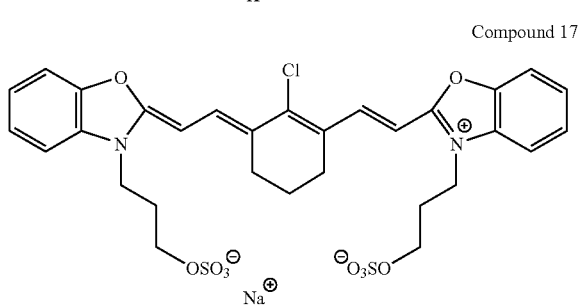

-continued

Compound 18
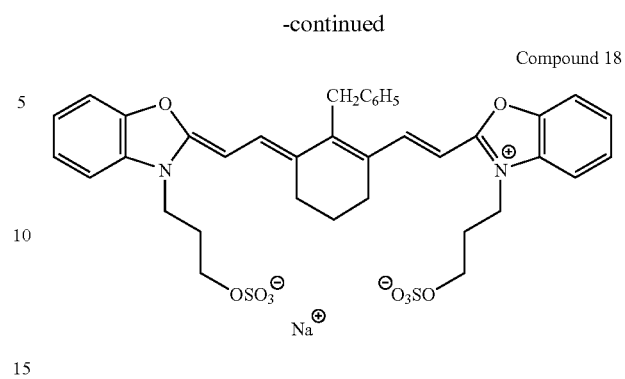

Compound 19
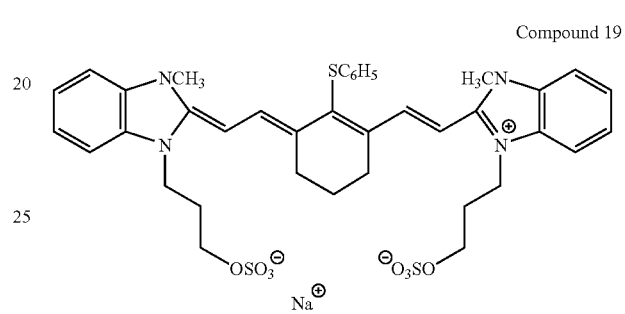

The hydrophilic infrared absorbing N-alkyl sulfate cyanine compounds can be converted to hydrophobic compounds by changing the pH. This removes the sulfate groups and converts the sulfate esters to the corresponding alcohols:

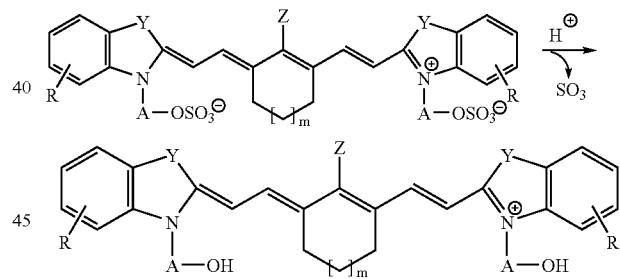

This reaction may be carried out by dissolving N-alkyl sulfate cyanine compound in alcohol/water and acidifying the solution to precipitate N-alkyl alcohol cyanine compound. Typically, the pH is decreased to about 4 or less, more typically about 3 or less, for example to about 1.

INDUSTRIAL APPLICABILITY

The invention introduces alkylsulfate functionality in the infrared absorbing cyanine compounds, which allows the infrared absorber to be converted from the hydrophilic sulfate compound to the hydrophobic alcohol upon pH change.

The infrared absorbing cyanine compounds are water soluble or water/alcohol soluble and can be used as the infrared absorber in thermally imageable elements. Thermally imageable elements typically comprise an imageable layer that comprises a binder. The imageable layer is over a substrate. The infrared absorbing cyanine compound may be present in the imageable layer, in an underlayer between the imageable layer and the substrate, and/or in an absorber layer between the imageable layer and the underlayer. Positive working imageable elements are described, for example, in Shimazu, U.S. Pat. No. 6,294,311, U.S. Pat. No. 6,352,812, and U.S. Pat. No. 6,593,055; Patel, U.S. Pat. No. 6,352,811; Savariar-Hauck, U.S. Pat. No. 6,358,669, U.S. Pat. No. 6,528,228; West, U.S. Pat. No. 6,090,532; Parsons, U.S. Pat. No. 6,280,899; McCullough, U.S. Pat. Pub. No. 2002/0136961; and WO99/21715; the disclosures of which are all incorporated herein by reference. Negative working imageable elements, such as are disclosed in, for example, in Haley, U.S. Pat. No. 5,372,907; Nguyen, U.S. Pat. No. 5,919,601; Kobayashi, U.S. Pat. No. 5,965,319; Busman, U.S. Pat. No. 5,763,134; WO 00/17711; and Huang, U.S. Pat. Pub. 2003/0064318, the disclosures of which are all incorporated herein by reference. The infrared absorbing cyanine compounds could also be used as CD record materials.

These imageable elements may be imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the CREO® Trendsetter (Creo, Burnaby, British Columbia, Canada), the Screen PlateRite model 4300, model 8600, and model 8800 (Screen, Rolling Meadows, Chicago, Ill., USA), and the Gerber Crescent 42T (Gerber).

The infrared absorbing cyanine compounds are especially useful on-press developable plates, such as those that use sulfated polymers as the binder in the imageable layer and are described in U.S. application Ser. No. 10/615,358, filed Jul. 10, 2003, and co-filed KPG-5094, the disclosures of which are incorporated herein by reference. These imageable elements are developable in conventional developers and in aqueous developers, including on-press developability with fountain solution and/or ink. The imaged imageable element may be directly mounted on press and the unimaged regions removed by fountain solution and/or ink, thereby avoiding a separate development step. In some cases, the imaged imageable element is developable in water, without organic solvents or other additives. Following development, the printing plate is rinsed with water and dried. A gumming solution that contains a water-soluble polymer such as gum arabic may be applied to the resulting developed image.

Once the imageable element has been imaged and processed to form a printing plate, printing can be carried out by applying a fountain solution and then a lithographic ink to the image on its surface. Fountain solution is taken up by the surface of the substrate exposed by imaging and development, and the ink is taken up by the complementary regions. The ink is transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

Unless indicated otherwise, all percentages are percentages by weight. In the Examples, "coating solution" refers to the mixture of solvent or solvents and additives coated, even though some of the additives may be in suspension rather than in solution.

Glossary

| | |
|---|---|
| ACR-1559 | 25% Polystrene-co-poly(ethylene glycol) in n-propanol/water (90/10), CAS# 115115-55-4 (Kodak Polychrome Graphics, Norwalk, CT, USA) |
| CREO® Trendsetter 3230 | Commercially available platesetter, using Procom Plus software and operating at a wavelength of 830 nm (Creo Products, Burnaby, BC, Canada) |
| DMF | N,N-dimethylformamide |
| Intermediate A | 2-chloro-1-formyl-3-hydroxymethylenecyclohexene |
| Intermediate B | 2,3,3-trimethyl-(3-sulfapropyl)indolenium, inner salt |
| Intermediate C | 2,3,3-trimethyl-(3-sulfaethyl)indolenium, inner salt |
| LODYNE® S-103A | Alkyl sodium sulfonate fluorosurfactant (Ciba Specialty Chemical, High Point, NC, USA) |
| N-13 | m-Cresol novolac resin having a MW of about 13 kDa (Eastman Kodak, Rochester, NY, USA) |
| Substrate A | 0.3 mm thick aluminum sheet which had been electrograined, anodized and treated with a solution of polyvinylphosphoric acid |

Example 1

This example illustrates the preparation of 2-chloro-1-formyl-3-hydroxymethylenecyclohexene (Intermediate A).

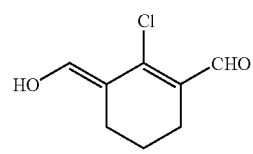

80 ml of DMF was placed in a 500 ml round bottom flask equipped with a magnetic stirrer, a nitrogen gas inlet, a condenser, a thermometer and a pressure-equalizing additional funnel. The flask was cooled in an ice-water bath and 74 ml of phosphorous oxychloride was slowly added to the DMF while the reaction temperature was maintained between 10 and 15° C. for one hour. Upon the completion of the addition, the reaction mixture was allowed to warm to room temperature for 30 minutes. A mixture of 20 g of cyclohexanone and 100 ml of DMF was slowly added o the flask the reaction temperature was maintained between 40 and 50° C. The mixture was heated at 55° C. for 3 hours in a water bath, and was then slowly poured into a mixture of 600 g of ice and 400 g of water. After the reaction mixture was stirred for about 15 h, the precipitate was filtered and washed with water until a neutral filtrate was obtained. The resulting yellow solid was collected and dried at ambient temperature in dark overnight. The yield was 26 g.

Example 2

This example illustrates the preparation of 2,3,3-trimethyl-(3-sulfapropyl)indolenium, inner salt (Intermediate B).

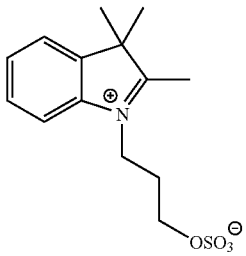

16 g of 2,3,3-trimethylindolenine (TCI America) was mixed with 15 g of 1,3-propanediol cyclic sulfate (Aldrich) in 200-ml of toluene in a 500-ml flask equipped with condenser and stirring bar. The mixture was heated at 100° C. in an oil bath for 14 hours. After the reaction mixture was cooled to room temperature, the toluene was decanted, and the orange solid residual was stirred with 500-ml of acetone for 3 h. The suspension was filtered and washed with 3×30 ml of acetone. The product was dried in ambient temperature. Yield: 16.6 g.

Proton NMR (in DMSO-$d_6$): δ 1.53 (6H, s), 2.20 (2H, pentet), 2.85 (3H, s), 3.88 (2H, t), 4.56 (2H, t) and 7.50–8.00 (4H, m).

Example 3

This example illustrates the preparation of 2-[2-[2-chloro-3-[[1,3-dihydro-3,3-dimethyl-1-(3-sulfapropyl)-2H-indol-2-ylidene]ethylidene]-1-cyclohexen-1-yl]ethenyl]-3,3-dimethyl-1-(3-sulfapropyl)-3H-Indolium, inner salt, compd. with N,N-diethyl-1-ethylamine (1:1)

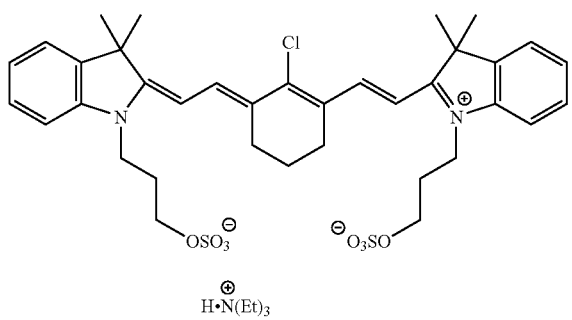

0.3 g of triethylamine and 0.2 g of acetic anhydride were dissolved in 5 g of DMF. 0.59 g of intermediate B and 0.18 g of intermediate A were added to the DMF solution. The mixture was stirred at room temperature for 1 h and the color turned into dark green. Another portion of 0.3 g of triethylamine and 0.2 g of acetic anhydride was added and the reaction mixture was stirred overnight. After the reaction mixture was cooled to 0–5° C. in a water-ice bath, the resulting precipitate was filtered off, washed with 30 ml of ethyl acetate, and dried in a vacuum. Yield: 0.40 g.

Proton NMR (in DMSO-$d_6$): δ 1.16 (9H, t), 1.68 (12H, s), 1.83 (2H, m), 2.02 (4H, m), 2.74 (4H, m), 3.10 (6H, m), 3.87 (4H, t), 4.26 (4H, t), 6.41 (2H, d), 7.2–7.8 (8H, m), 8.26 (2H, d) and 8.85 (1H, br).

Example 4

This example illustrates the preparation of 2-[2-[2-chloro-3-[[1,3-dihydro-3,3-dimethyl-1-(3-sulfapropyl)-2H-indol-2-ylidene]ethylidene]-1-cyclohexen-1-yl]ethenyl]-3,3-dimethyl-1-(3-sulfapropyl)-3H-Indolium, inner salt, compd. with sodium (1:1)

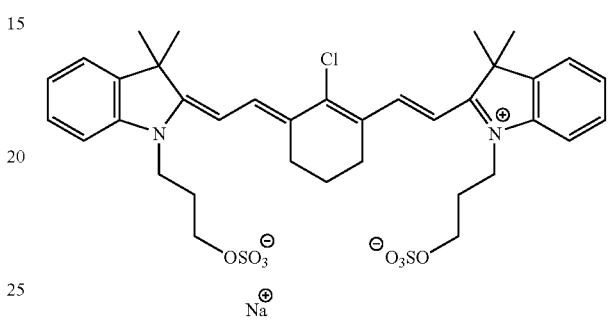

2.0 g of infrared absorber formed in Example 3 was stirred with 20-ml water, 30 ml methanol and 1 g of sodium acetate for 1 h. The solid was filtered off, washed with 10 ml of water followed by 10 ml of methanol, and dried at room temperature overnight. Yield: 1.8 g.

Proton NMR (in DMSO-$d_6$): δ 1.69 (12H, s), 1.84 (2H, m), 2.03 (4H, m), 2.75 (4H, m), 3.89 (4H, t), 4.27 (4H, t), 6.42 (2H, d), 7.2–7.8 (8H, m) and 8.28 (2H, d)

Example 5

This example illustrates the acid hydrolysis of 2-[2-[2-chloro-3-[[1,3-dihydro-3,3-dimethyl-1-(3-sulfapropyl)-2H-indol-2-ylidene]ethylidene]-1-cyclohexen-1-yl]ethenyl]-3,3-dimethyl-1-(3-sulfapropyl)-3H-Indolium, inner salt, compd. with N,N-diethyl-1-ethylamine (1:1)

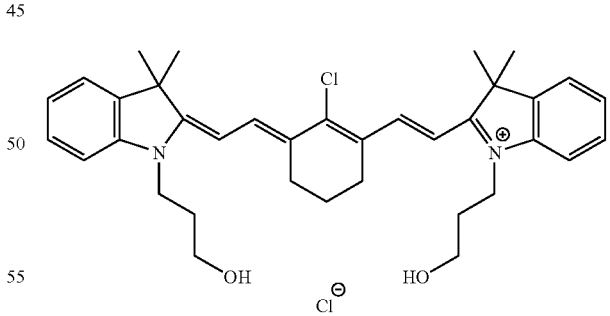

0.5 g of the infrared absorber formed in Example 3 was dissolved in 50 ml of water and 10 ml of 2-propanol. 10 ml of 5% hydrochloric acid was added, and the mixture was stirred at room temperature for 1 h. The resulting precipitate was filtered and washed with 10 ml of water. The solid was dried at room temperature overnight. Yield: 0.26 g.

Proton NMR (in DMSO-$d_6$): δ 1.67 (12H, s), 1.82 (2H, m), 2.01 (4H, m), 2.73 (4H, m), 3.87 (4H, t), 4.25 (4H, t), 6.40 (2H, d), 7.2–7.8 (8H, m) and 8.25 (2H, d)

Example 6

This example illustrates the preparation of 2,3,3-trimethyl-(3-sulfaethyl)indolenium, inner salt (Intermediate C).

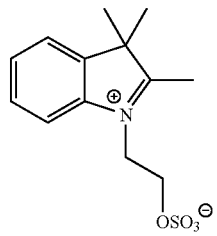

4.0 g of 2,3,3-trimethylindolenine (TCI America) was mixed with 3.1 g of 1,3,2-dioxathiolane-2,2-dioxide (Aldrich) in 50-ml of toluene in a 100-ml flask equipped with condenser and stirring bar. The mixture was heated at 100° C. in an oil bath for 14 hours. After the reaction mixture was cooled to room temperature, the toluene was decanted, and the orange solid residual was stirred with 100-ml of acetone for 3 h. The suspension was filtered and washed with 3×50 ml of acetone. The product was dried in ambient temperature. Yield: 3.8 g.

Proton NMR (in DMSO-$d_6$): δ 1.53 (6H, s), 2.82 (3H, s), 4.21 (2H, t), 4.71 (2H, t) and 7.50–8.05 (4H, m).

Example 7

This example illustrates the preparation of 2-[2-[2-chloro-3-[[1,3-dihydro-3,3-dimethyl-1-(3-sulfaethyl)-2H-indol-2-ylidene]ethylidene]-1-cyclohexen-1-yl]ethenyl]-3,3-dimethyl-1-(3-sulfapropyl)-3H-Indolium, inner salt, compd. with N,N-diethyl-1-ethylamine (1:1).

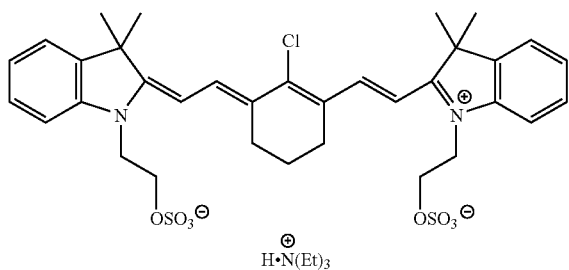

0.3 g of triethylamine and 0.2 g of acetic anhydride were dissolved in 5 g of DMF. 0.55 g of Intermediate C and 0.18 g of intermediate A were added to the DMF solution. The mixture was stirred at room temperature for 1 h and the color turned into dark green. Another portion of 0.3 g of triethylamine and 0.2 g of acetic anhydride was added and the reaction mixture was stirred overnight. After the reaction mixture was cooled to 0–5° C. in a water-ice bath, the resulting precipitate was filtered off, washed with 30 ml of ethyl acetate, and dried in a vacuum. Yield: 0.36 g.

Proton NMR (in DMSO-$d_6$): δ 1.15 (9H, t), 1.68 (12H, s), 1.82 (2H, m), 2.74 (4H, m), 3.05 (6H, m), 4.10 (4H, t), 4.44 (4H, t), 6.52 (2H, d), 7.2–7.8 (8H, m), 8.25 (2H, d) and 8.80 (1H, br).

Example 8

A coating solution was prepared by combining 2.6 g of ACR-1559, 0.05 g the infrared absorber formed in Example 4, and 0.02 g of 10% LODYNE® S-103A in 6 g of water and 2 g of 2-propanol. The coating solution was coated onto Substrate A. The resulting imageable element consisting on an imagable layer on a substrate was dried at 100° C. in a Ranar conveyor oven for about one minute. Dry coating weight the imageable layer: about 0.86 g/$m^2$ (80 mg/$ft^2$).

The imageable element was imaged on a CREO® Trendsetter 3244x at an imaging energy of 200 mJ/$cm^2$. The imaged imageable element was then mounted directly on an AB Dick duplicator press (A.B. Dick, Niles, Ill., USA). The press was charged Van Son Rubber Base Ink (Van Son Ink, Mineola, N.Y., USA). The aqueous fountain solution contained about 23.5 ml/L (3 oz per gallon) Varn Litho Etch142W (Varn International, Addison, Ill., USA), and about 23.5 ml/L (3 oz per gallon) Varn PAR (alcohol substitute) in water. This fountain solution had a pH of 4. The resulting printing plate printed at least 250 copies of good quality prints.

Example 9

This example illustrates preparation of a sulfated novolac resin.

In a 250-ml flask equipped with magnetic stirring bar, 10.0 g of N-13, 8.0 g of pyridine-$SO_3$ complex (Aldrich, Milwaukee, Wis., USA), and 50 g of pyridine were mixed, and the mixture was stirred at room temperature for 18 h. Solvent was then decanted from the reaction. The reaction product was stirred with 10 ml of 30% aqueous ammonium hydroxide for 30 minutes. The resulting sulfated novolac resin was precipitated in 600 ml of 2-propanol. The precipitate was then dissolved in 100 g of water to yield a 17 wt % aqueous solution for further use. The sulfated novolac resin in aqueous solution was maintained at a pH of about 7 or above. The sulfated resin is stable in neutral or basic conditions, but will decompose when exposed to acidic conditions.

Based on the quantity of reagents used, the theoretical degree of sulfation (i.e., assuming 100% substitution) was about 0.60. An elemental analysis was performed on the precipitate to determine the actual degree of sulfation. The sulfur content was approximately 7.8% by weight, which suggested a degree of sulfation of about 0.40.

Example 10

A coating solution was prepared by combining 3.3 g of 12.8% sulfated N-13 novolac resin, 6.7 g of water, 0.05 g of the infrared absorber from Example 3 and 0.02 g of 10% LODYNE® S-103A. The coating solution was coated onto Substrate A with a wire wound bar. The resulting imageable element consisting on an imageable layer on a substrate was dried at 100° C. in a Ranar conveyor oven for about one minute. The dry coating weight of the imageable layer was about 1.0 g/$m^2$.

The imageable element was placed on a CREO® Trendsefter 3244x and imaged at a power of 12 W and a range of drum speeds from 210 to 50 rpm (ranged from 130 to 550 mJ/$cm^2$). The imaged imageable element was subsequently developed in tap water to remove the imaged regions of the imageable layer. The minimum exposure energy to achieve a good image was about 450 mJ/$cm^2$.

Example 11

The copolymer shown below (PP-3) (Kokusan Chemical, Tokyo, Japan) was converted to a sulfated copolymer by the following general procedure.

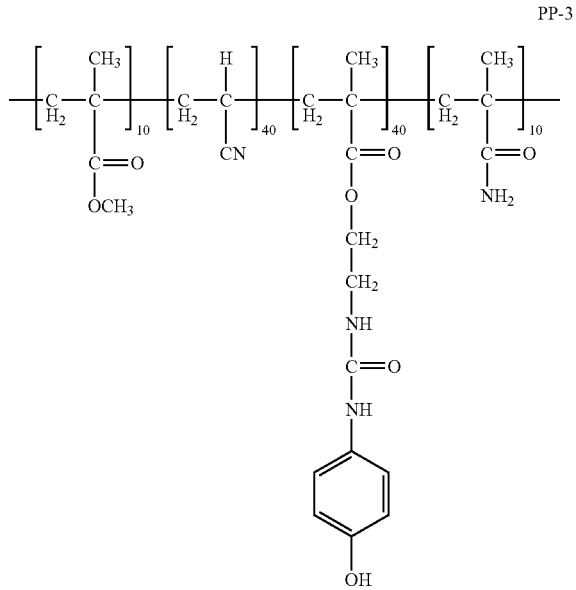

PP-3

In a 250 ml flask equipped with magnetic stirring bar, 5.0–10.0 g of precursor polymer, 2.0–8.0 g of pyridine-SO$_3$ complex, and 25–100 g of pyridine was added, and the mixture was stirred at room temperature for 18 hours. The solvent was decanted from the reaction mixture, and the product stirred with 2–10 ml of 25% tetramethylammonium hydroxide for 30 minutes. The reaction mixture was then precipitated in 600–1,000 ml of 2-propanol or tetrahydrofuran, and the resulting polymer was then dissolved in 20–100 g of water (or water/alcohol) for further use.

Example 12

A coating solution containing 6.0 wt % of the sulfated copolymer prepared in Example 11, 0.5 wt % of infrared cyanine absorbing compound prepared in Example 3, and a trace of LODYNE® S-103A was onto Substrate A using a slot coating device. The resulting imageable element, consisting of the imageable layer on the substrate, was dried in a Ranar conveyor oven at about 76° C. for about one minute. The dry coating weight of the imageable layers was 1.6 g/m.

The imageable element was imaged on a CREO® Trendsetter 3244x at an imaging energy of 130–550 mJ/cm². The imaged imageable element was developed in tap water to remove the non-imaged regions. The minimum exposure to produce an image was 160 mJ/cm².

Having described the invention, we now claim the following and their equivalents:

1. An imageable composition comprising a binder that is a negatively-charged sulfated polymer and an infrared absorbing cyanine compound having the structure:

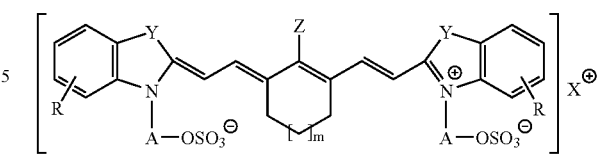

in which:
R is hydrogen, or R is one or more alkyl, substituted or unsubstituted aralkyl, alkoxy, carboxyl, nitro, cyano, trifluoromethyl, acyl, alkyl sulfonyl, aryl sulfonyl, or halogen groups, or R is the atoms necessary to form a substituted or unsubstituted benzo group;
A is (CH$_2$)$_n$; where n is 1–5;
Y is C(R')$_2$, where R' is hydrogen or alkyl;
Z is hydrogen, halogen, alkyl, substituted or unsubstituted aralkyl; substituted or unsubstituted aryloxy, substituted or unsubstituted thioaryloxy, or substituted or unsubstituted diphenylamino;
m is zero or one; and
X is a cation.

2. The composition of claim 1 in which Y is C(CH$_3$)$_2$.
3. The composition of claim 2 in which Z is chloro, phenoxyl, thiophenoxyl, or diphenylamino.
4. The composition of claim 3 in which R is hydrogen.
5. The composition of claim 1 in which n is 2, 3, or 4.
6. The composition of claim 1 in which Z is chloro.
7. The composition of claim 1 in which R represents the atoms necessary to form an unsubstituted benzo group.
8. The composition of claim 1 in which X is sodium, potassium, lithium, ammonium, or substituted animonium containing one to sixteen carbon atoms.
9. The composition of claim 1 wherein said sulfated polymer is a sulfated novolac or sulfated addition copolymer.
10. An imageable composition comprising a binder that is a negatively-charged sulfated polymer and an infrared absorbing cyanine compound having the structure:

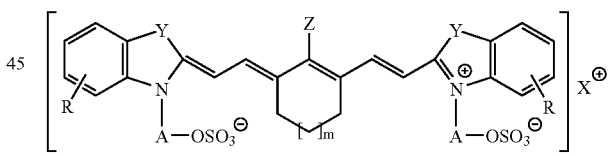

in which:
R is hydrogen, or R is one or more alkyl, substituted or unsubstituted aralkyl, alkoxy, carboxyl, nitro, cyano, trifluoromethyl, acyl, alkyl sulfonyl, aryl sulfonyl, or halogen groups, or R is the atoms necessary to form a substituted or unsubstituted benzo group;
A is (CH$_2$)$_n$; where n is 1–5;
Y is O, S, or NR', where R' is hydrogen or alkyl;
Z is hydrogen, halogen, alkyl, substituted or unsubstituted aralkyl; substituted or unsubstituted aryloxy, substituted or unsubstituted thioaryloxy, or substituted or unsubstituted diphenylamino;
m is zero or one; and
X is a cation.

11. The composition of claim 10 in which Y is O or NCH$_3$.
12. The composition of claim 11 in which Z is chloro, phenoxyl, thiophenoxyl, or diphenylamino.

13. The composition of claim 12 in which R is hydrogen.

14. The composition of claim 10 in which Y is S.

15. The composition of claim 14 in which Z is chloro, phenoxy, thiophenoxy, or diphenylamino.

16. The composition of claim 15 in which R is hydrogen.

17. The composition of claim 16 in which n is 2, 3, or 4.

* * * * *